(12) United States Patent
Handing et al.

(10) Patent No.: US 8,201,861 B2
(45) Date of Patent: Jun. 19, 2012

(54) BUMPER SYSTEM

(75) Inventors: Christian Handing, Langenberg (DE);
Konstantin Tatarinov, Bielefeld (DE);
Michael Roll, Herford (DE); Jochem Grewe, Salzkotten (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/948,253

(22) Filed: Nov. 17, 2010

(65) Prior Publication Data
US 2011/0121587 A1 May 26, 2011

(30) Foreign Application Priority Data

Nov. 20, 2009 (DE) .......................... 10 2009 053 861

(51) Int. Cl.
*B60R 19/26* (2006.01)

(52) U.S. Cl. ........................................ 293/132; 293/133

(58) Field of Classification Search ................... 293/132, 293/133
See application file for complete search history.

(56) References Cited

U.S. PATENT DOCUMENTS

| 6,299,227 | B1 * | 10/2001 | Kroning et al. | ............... 293/132 |
| 7,210,719 | B2 * | 5/2007 | Honda et a | ...................... 293/155 |
| 7,290,811 | B1 * | 11/2007 | Arns et al. | ...................... 293/133 |
| 7,793,997 | B2 * | 9/2010 | Karlander | ....................... 293/133 |
| 7,896,410 | B2 * | 3/2011 | Morikawa et al. | ............ 293/120 |

* cited by examiner

*Primary Examiner* — Joseph Pape
(74) *Attorney, Agent, or Firm* — Henry M. Feiereisen; Ursula B. Day

(57) ABSTRACT

A bumper system includes a crossbeam having ends constructed to form attachment zones, and two crash boxes which are secured to side rails of a motor vehicle and coupled to the attachment zones, respectively. The crossbeam has a front wall, a rear wall, and an inner wall which extends between the front and rear walls along a major length of the crossbeam. The inner wall is hereby recessed to leave a gap in the area of the attachment zones.

19 Claims, 2 Drawing Sheets

BUMPER SYSTEM

CROSS-REFERENCES TO RELATED APPLICATIONS

This application claims the priority of German Patent Application, Serial No. 10 2009 053 861.5-21, filed Nov. 20, 2009, pursuant to 35 U.S.C. 119(a)-(d), the content of which is incorporated herein by reference in its entirety as if fully set forth herein.

BACKGROUND OF THE INVENTION

The present invention relates to a bumper system for a motor vehicle.

The following discussion of related art is provided to assist the reader in understanding the advantages of the invention, and is not to be construed as an admission that this related art is prior art to this invention.

Bumpers are typically installed across the front and rear of motor vehicles to absorb impact energy in the event of a collision to substantially prevent damage to the support structure of the vehicle. The bumper system normally includes a shock-absorbing component, like a crash box, to convert the impact energy into deformation work, and a crossbeam to introduce the energy as a result of the impact into the crash box. The bumper system is constructed to install the end face of the crash box in midsection on the side rail of the motor vehicle and to introduce the impact energy with smallest possible bending moment via the crossbeam into the crash box and thus also into the side rail.

Crossbeams constructed in the form of a two-chamber hollow section are known and welded or threadably engaged onto crash boxes. In crash tests, the stiffness of the crossbeam is an important factor with respect to the behavior of the crash boxes. Bumpers are inspected by various crash tests involving high-speed tests and low-speed tests. Crash tests at higher speeds demand a high stiffness of the crossbeams in particular in the middle part thereof, whereas crash tests at lower speed demand a higher ductility of the bumper which is realized by crash boxes. Reconciliation of these seemingly contradictory requirements poses a problem heretofore to optimize bumper designs when considering the acceleration encountered in the event of a crash in relation to the deformation path.

It would therefore be desirable and advantageous to provide an improved bumper system which obviates prior art shortcomings and which exhibits a crash behavior which meets safety standards demanded by high-speed and low-speed crash tests.

SUMMARY OF THE INVENTION

According to one aspect of the present invention, a bumper system includes a crossbeam having ends constructed to form attachment zones, and two crash boxes constructed for securement to side rails of a motor vehicle and coupled to the attachment zones, respectively, wherein the crossbeam has a front wall, a rear wall, and an inner wall extending between the front and rear walls along a major length of the crossbeam, with the inner wall being recessed to define a gap in the area of the attachment zones.

The present invention resolves prior art problems by providing the crossbeam with an inner wall between the front and rear walls to divide the crossbeam into two chambers, whereby the inner wall is sized shy of the attachment zones. In other words, the inner wall extends over a major part of the length of the crossbeam between the crash boxes and is removed from the area of the attachment zones so that the crossbeam area between the crash boxes is stiffened. As a result, an optimal force level is attained for an insurance classification test. Suitably, the inner wall of the crossbeam extends in midsection thereof to form a center wall.

Stiffness of the crossbeam is an important factor for the deformation behavior in the event of a crash at high speed. By removing the inner wall from the area of the attachment zones, the crossbeam is able to more easily collapse or crumple in the attachment zones, resulting in greater ductility of the crash behavior in a collision at lower speed. Recessing or shortening the inner wall to leave a gap in the attachment zone also reduces the force level in the event of a crash. The bumper system thus exhibits an optimal force level and optimal absorption capability. Of course, the inner wall may also be formed with additional gaps over its entire length for decreasing the overall weight for example.

According to another advantageous feature of the present invention, the crossbeam may be formed interiorly in the area of the attachment zones with wall protrusions as remnants which merge into the inner wall. The wall protrusions can hereby be formed on the front wall and/or rear wall of the crossbeam. By recessing the inner wall at least in the area of the attachment zones, the wall protrusions can be used to further optimize the stiffness with respect to the demand at hand. By increasing or decreasing the size of the wall protrusions, the stiffness of the crossbeam can be adjusted. Moreover, production becomes highly cost-effective because for example, there is no need for a milling head to completely remove the inner wall when recessing the inner wall in the area of the attachment zone.

According to another advantageous feature of the present invention, each crash box may have at least one tongue to overlap the crossbeam, with the tongue configured to extend in longitudinal direction of the motor vehicle. To attain an optimum force level, the tongue is formed as a prolongation of the crash box. The tongue may extend above as well as below the crossbeam. Of course, the presence of two tongues on the crash box, arranged above and below the crossbeam, may also be conceivable. The tongue may be configured to optimize a deformation behavior in coordination with the crossbeam. The rear wall can hereby be suitably constructed without any gap in the attachment zone of the crash box. By recessing the inner wall to form a gap in the area of the attachment zone and forming the front and/or rear walls with wall protrusions, the bumper system is able to crumple in an optimum manner.

According to another advantageous feature of the present invention, the tongue can be sized to extend upon the crossbeam to the front wall thereof. Fully overlapping the upper side or underside of the crossbeam influences the deformation or crumpling behavior of the crossbeam. As a result, the bumper system can further be best suited to the required force level. Fully covering the crossbeam in the area of the tongue in longitudinal direction of the vehicle also optimizes the crumpling behavior of the upper and lower parts of the crossbeam. In addition, there is the benefit that the crossbeam can be connected to the crash box by interference fit, material joint, or formfit, or any combinations thereof.

According to another advantageous feature of the present invention, the tongue may have at least one embossment for reinforcement. In addition to an optimal configuration of crossbeam, crash box, and tongue with respect to deformation behavior, the presence of an embossment enables a further stiffening of the tongue. As a result, the crossbeam is stiffer in longitudinal direction of the vehicle in the attachment zone. This is important in particular in connection with the high-speed test that requires an increased stiffness of the bumper system. The embossment may be configured as a stamped structure of different geometry in order to stiffen a surface of the tongue. The embossment may be configured in longitudinal direction of the vehicle or in vertical direction. As a result, the crash behavior in longitudinal direction of the vehicle is influenced as is the expansion of the upper and lower sides of the crossbeam in vertical direction.

According to another advantageous feature of the present invention, the embossment may extend from the crash box on the tongue. As a result, the deformation behavior of all components of the bumper system can be optimized and best suited to one another. The crash box can be manufactured with integrated tongue and embossment in a particularly cost-effective manner because they can be made for example as compression-molded part so that a single production step suffices.

According to another advantageous feature of the present invention, the crossbeam may have a trough-shaped receptacle for receiving the tongue. This also simplifies the production process and optimizes the attachment of the crash box to the crossbeam. Attachment may hereby be implemented for example by material joint, formfit, or friction fit. The trough-shaped receptacle may also be formed with reinforcements, thickened areas and/or hardened areas to increase stiffness and to best suit the crash behavior to the situation at hand, for example for an off-road vehicle compared to a small car.

According to another advantageous feature of the present invention, the tongue may be made of a material that is more ductile than a material of the crossbeam. As a result, the tongue of the crash box, which overlaps the crossbeam, effects a controlled crumpling of the upper and lower sides of the crossbeam during a crash. The more ductile material property of the tongue permits a limited bending of the tongue compared to the hard crossbeam which buckles when exposed to a certain force. Suitably, the tongue and the crash box may be constructed as separate components. In this way, the crash box and the tongue may be made of different materials and best suited to the crash demands at hand. Manufacture is also simplified because the tongue can be made separately and coupled to the crash box later.

According to another advantageous feature of the present invention, the crash boxes may be connected to the crossbeam by welding or bolting or a combination thereof. This further optimizes crash behavior of crossbeam and crash box. For example, the tongue may be welded about its circumference to the crossbeam, so that the stiffness and crumpling behavior of tongue and crossbeam can further be optimized.

According to another advantageous feature of the present invention, the crash box and the crossbeam may be made of aluminum material. Coupling of the crash box with the crossbeam may be realized by thermal joining, e.g. welding. The crash boxes may be manufactured in single-shell construction, dual-shell construction, or multi-shell construction.

According to another advantageous feature of the present invention, the crossbeam can be manufactured as roll-formed structure. Crossbeam and crash box may also be manufactured from steel.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
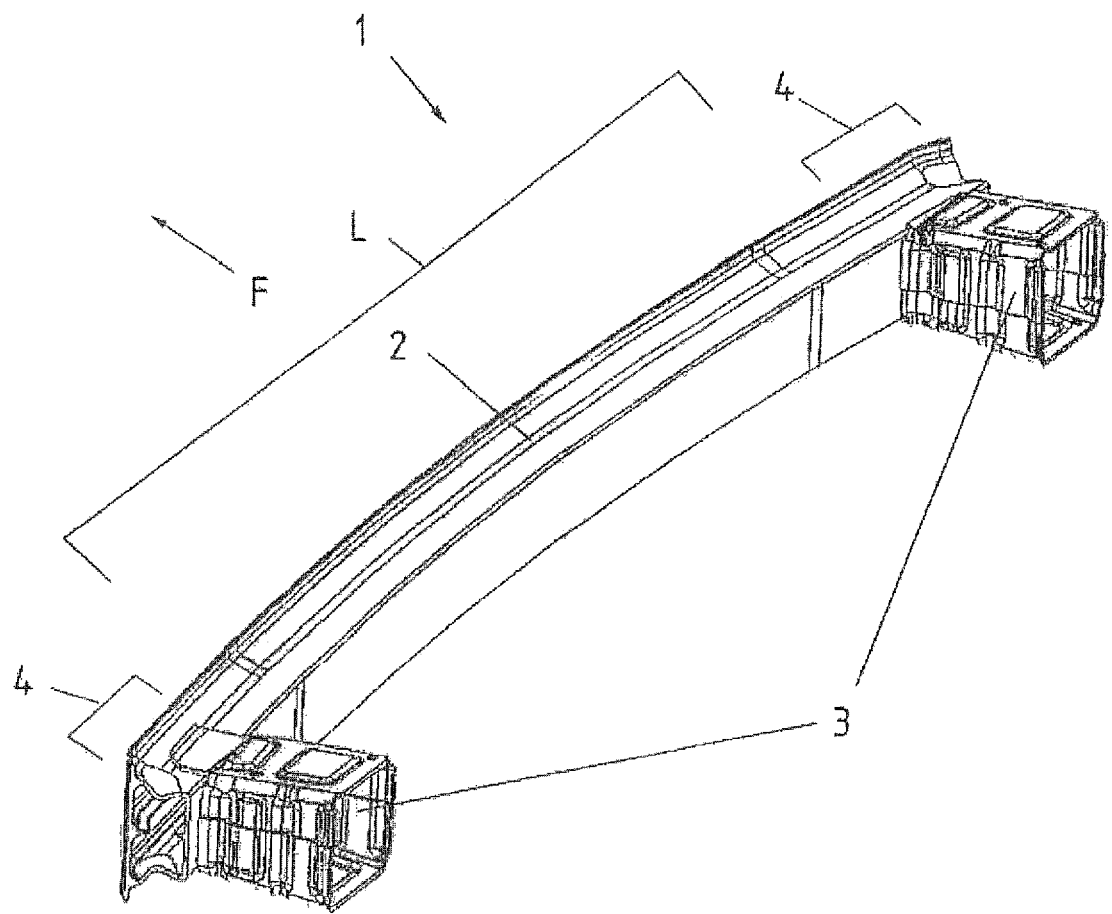
FIG. 1 is a top, rear and side perspective view of a bumper system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top, rear and side perspective view of a bumper system according to the present invention, generally designated by reference numeral 1 and including a crossbeam 2, which can be manufactured as roll-formed structure, and two crash boxes 3 which are coupled to the crossbeam 2 in attachment zones 4 and secured to unillustrated side rails of a motor vehicle. The crash boxes 3 can hereby be connected to the crossbeam 2 by welding or bolting or a combination thereof. The crash boxes 3 and the crossbeam can be made of aluminum material or steel. In the event of a crash in longitudinal direction F of the vehicle, energy is conducted through the bumper system 1 via the crossbeam 2 into the crash boxes 3 which in turn transfer the energy into the side rails.

Figure 2:
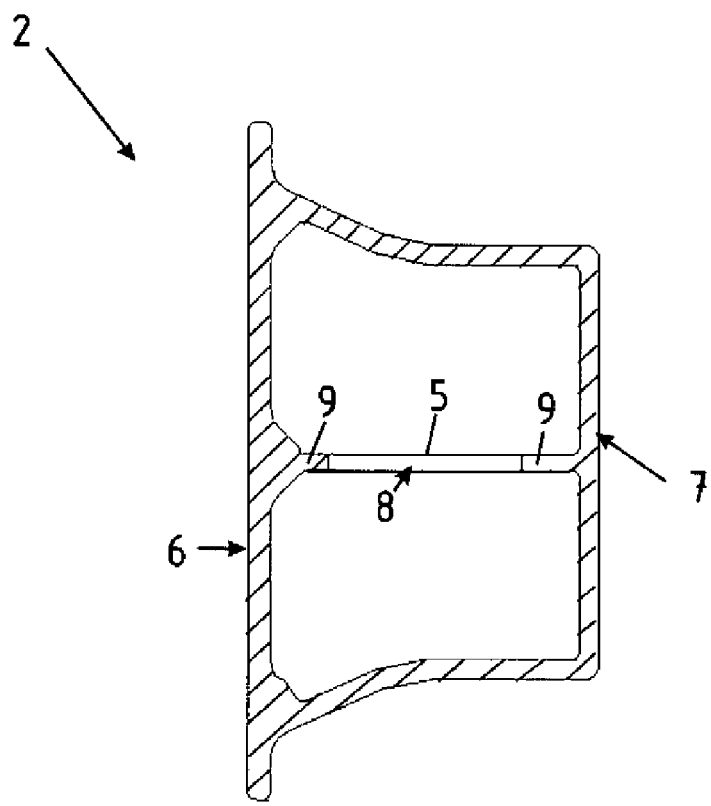
FIG. 2 is a cross section of a crossbeam of the bumper system of FIG. 1 in an area of an attachment zone.

FIG. 2 shows a cross section of the crossbeam 2 of the bumper system 1 in an area of the attachment zone 4. The crossbeam 2 is constructed as a two-chamber hollow section and includes a front wall 6, a rear wall 7, and an inner wall 5 which extends between the front wall 6 and the rear wall 7 over a length L of the crossbeam 2 between the crash boxes 3. The inner wall 5 is shown in the cross sectional view of FIG. 2 as end view, depicting the formation of a gap 8 in the attachment zone 4. Wall protrusions 9 in the area of the gap 8 extend inwards from the front and rear walls 6, 7, respectively, of the crossbeam 2.

Figure 3:
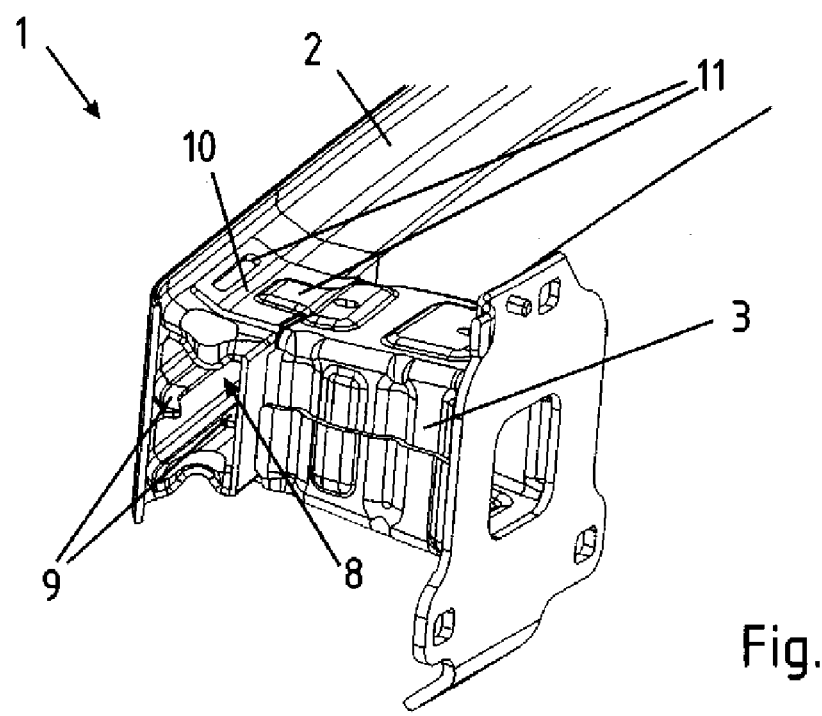
FIG. 3 is an enlarged detailed top, rear and side perspective view of the crash box and crossbeam of the bumper system of FIG. 1 in an area of the attachment zone.

FIG. 3 shows an enlarged detailed top, rear and side perspective view of the crash box 3 and crossbeam 2 of the bumper system 1, with the crossbeam 2 being coupled with the crash box 3 in the area of the attachment zone 4. The crossbeam 2 is formed with the wall protrusions 9 in the attachment zone 4 to demarcate the gap 8. The wall protrusions 9 remain in the crossbeam 2 on the front wall 6 and rear wall 7 as remnants of the removed inner wall 5.

The crash box 3 is further provided with tongues 10 which extend on the crossbeam 2 up to the front wall 6. The tongues 10 are formed with reinforcements in the form of embossments 11 for example. One of the embossments 11, as shown in FIG. 3 is sized to extend from the crash box 3 to an area on the tongue 10. In other words, this embossment 11 extends in one piece in a transition zone between the crash box 3 and the tongue 10. The tongue can be made of a material that is more ductile than a material of the crossbeam.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A bumper system, comprising:
    a crossbeam having ends constructed to form attachment zones, said crossbeam having a front wall, a rear wall, and an inner wall extending between the front and rear walls along a major length of the crossbeam, said inner wall being recessed to define a gap in the area of the attachment zones; and
    two crash boxes constructed for securement to side rails of a motor vehicle and coupled to the attachment zones, respectively,
    wherein the inner wall extends in midsection of the crossbeam to define a center wall.

2. The bumper system of claim 1, wherein the crossbeam is formed interiorly in the area of the attachment zones with wall protrusions which merge into the inner wall.

3. The bumper system of claim 2, wherein the wall protrusions are formed on at least one of the front wall and rear wall of the crossbeam.

4. A bumper system, comprising:
    a crossbeam having ends constructed to form attachment zones, said crossbeam having a front wall, a rear wall, and an inner wall extending between the front and rear walls along a major length of the crossbeam, said inner wall being recessed to define a gap in the area of the attachment zones; and
    two crash boxes constructed for securement to side rails of a motor vehicle and coupled to the attachment zones, respectively,
    wherein each said crash box has at least one tongue to overlap the crossbeam, said tongue configured to extend in longitudinal direction of the motor vehicle.

5. The bumper system of claim 4, wherein the tongue is sized to extend upon the crossbeam to the front wall thereof.

6. The bumper system of claim 4, wherein the tongue has at least one embossment for reinforcement.

7. The bumper system of claim 6, wherein the embossment is sized to extend from the crash box to an area on the tongue.

8. The bumper system of claim 4, wherein the tongue is made of a material that is more ductile than a material of the crossbeam.

9. The bumper system of claim 4, wherein the tongue and the crash box are constructed as separate components.

10. The bumper system of claim 1, wherein the crash boxes are connected to the crossbeam by welding or bolting or a combination thereof.

11. The bumper system of claim 1, wherein the crash boxes and the crossbeam are made of aluminum material.

12. The bumper system of claim 1, wherein the crossbeam is a roll-formed structure.

13. The bumper system of claim 1, wherein the crash boxes and the crossbeam are made of steel.

14. The bumper system of claim 4, wherein the crossbeam is formed interiorly in the area of the attachment zones with wall protrusions which merge into the inner wall.

15. The bumper system of claim 14, wherein the wall protrusions are formed on at least one of the front wall and rear wall of the crossbeam.

16. The bumper system of claim 4, wherein the crash boxes are connected to the crossbeam by welding or bolting or a combination thereof.

17. The bumper system of claim 4, wherein the crash boxes and the crossbeam are made of aluminum material.

18. The bumper system of claim 4, wherein the crossbeam is a roll-formed structure.

19. The bumper system of claim 4, wherein the crash boxes and the crossbeam are made of steel.

* * * * *